United States Patent [19]
Kim

[11] Patent Number: 5,860,886
[45] Date of Patent: Jan. 19, 1999

[54] HYDRAULIC CONTROL DEVICE FOR AUTOMATIC TRANSMISSIONS

[75] Inventor: Tae Kyun Kim, Seoul, Rep. of Korea

[73] Assignee: Hyundai Motor Company, Seoul, Rep. of Korea

[21] Appl. No.: 922,797

[22] Filed: Sep. 2, 1997

[30] Foreign Application Priority Data

Aug. 30, 1996 [KR] Rep. of Korea .................. 1996-37011

[51] Int. Cl.⁶ .................................................. B60K 41/06
[52] U.S. Cl. ........................................... 475/128; 477/117
[58] Field of Search .............................. 475/128; 477/117

[56] References Cited

U.S. PATENT DOCUMENTS

| | | | |
|---|---|---|---|
| 4,748,870 | 6/1988 | Sugino et al. .......................... | 477/117 |
| 5,078,028 | 1/1992 | Ishikawa et al. ....................... | 477/117 |
| 5,107,723 | 4/1992 | Yamashita et al. ..................... | 477/117 |
| 5,655,994 | 8/1997 | Jang et al. ............................. | 477/117 |
| 5,720,694 | 2/1998 | Jang ...................................... | 477/117 |
| 5,749,802 | 5/1998 | Tamahashi et al. .................... | 477/117 |

*Primary Examiner*—Dirk Wright
*Attorney, Agent, or Firm*—Christie, Parker & Hale, LLP

[57] ABSTRACT

A hydraulic control device for automatic transmissions is disclosed. The control device of this invention includes a valve means, of which the valve spool is selectively actuated by a drive pressure, the spring force of a valve spring or a control pressure from the PCV, with the control pressure being used in event of an R-N-D shifting operation. The hydraulic control device thus slowly releases the front clutch pressure during an N-D shifting operation and quickly releases the front clutch pressure during an R-N-D shifting operation, thus smoothly performing the R-N-D shifting operation without generating any shifting shock.

2 Claims, 9 Drawing Sheets

FIG. 2
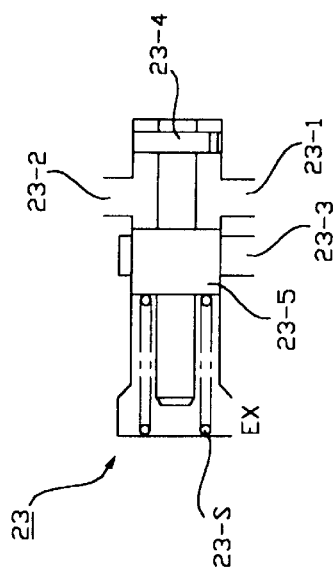
FIG. 2A
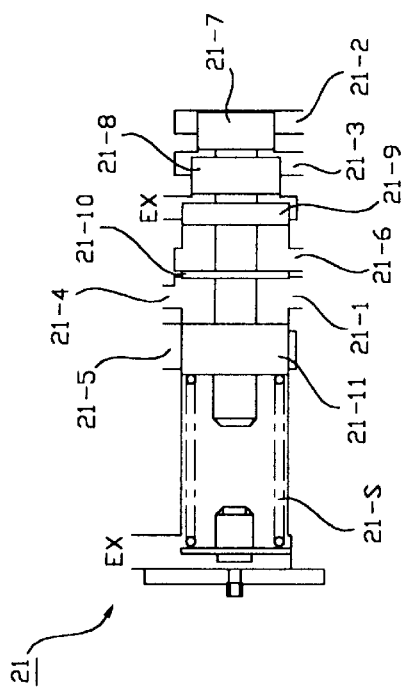
FIG. 2B
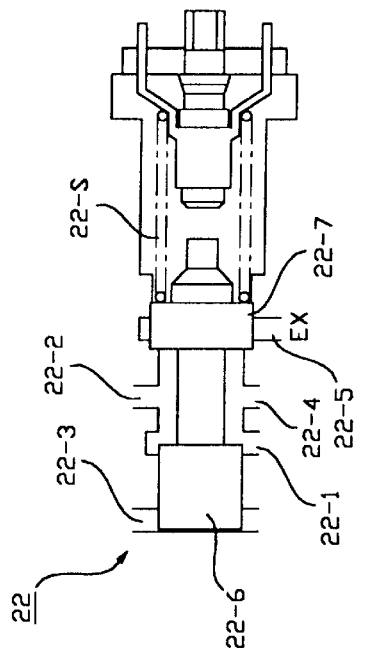
FIG. 2C
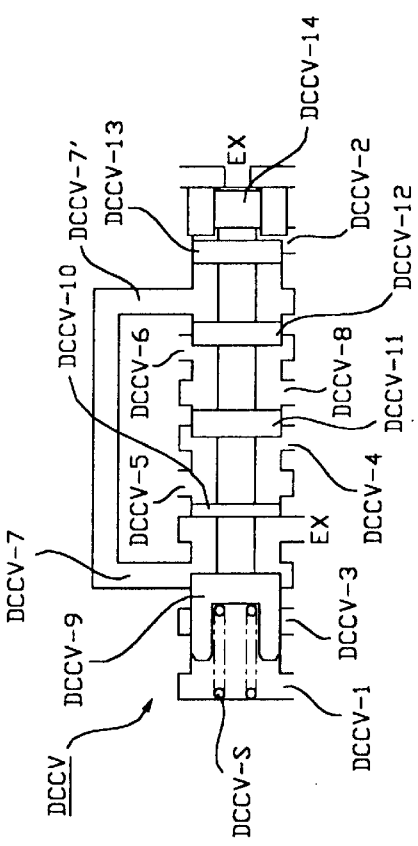
FIG. 2D

HYDRAULIC CONTROL DEVICE FOR AUTOMATIC TRANSMISSIONS

BACKGROUND OF THE INVENTION

1. Field of the Invention

The present invention relates, in general, to 4-stage automatic transmissions used for electronically changing the speed of a driven shaft of an automobile between four stages and, more particularly, to a hydraulic control device for such transmissions capable of performing an R-N-D shifting operation without generating any shifting shock, thus immediately and smoothly performing such an R-N-D shifting operation.

2. Description of the Prior Art

As well known to those skilled in the art, an automatic transmission for automobiles is comprised of a torque converter, a change gear mechanism and a hydraulic control circuit. The change gear mechanism is connected to the torque converter, while the hydraulic control circuit selectively actuates the gears of the change gear mechanism in accordance with running conditions of a car.

In the torque converter, an impeller is directly connected to the crank shaft of an engine, while a turbine is directly connected to the driving shaft of the transmission and is placed opposite to the impeller. In the operation of the torque converter, pressurized oil is fed from the impeller to the turbine, thus transmitting kinetic energy to the turbine prior to being returned to the impeller. In order to change the flowing direction of return oil and increase torque of the impeller, the torque converter also includes a stator.

In the operation of the automatic transmission, engine output power is primarily transmitted to the impeller of the torque converter and is secondarily transmitted to the change gear mechanism through the turbine of the converter. The change gear mechanism is an epicyclic gear train, which is comprised of a sun gear, a ring gear and a gear carrier. When the gears of the epicyclic gear train are appropriately controlled, they convert the torque from the turbine into a speed change ratio due to their relative rotating motions prior to transmitting the torque to the driven shaft of the transmission.

In order to control the gears of the change gear mechanism, the transmission also includes a plurality of frictional members, such as a front clutch, a rear clutch, a low-reverse brake, an end clutch and a quick-down brake. The above frictional members are actuated by pressurized oil output from an engine-operated oil pump.

When a plurality of sensors, which are mounted to predetermined parts of a car, apply signals, indicative of running conditions of the parts, to a TCU (Transmission Control Unit), the TCU operates the signals and controls a plurality of solenoid valves. The solenoid valves are mounted to the oil passages extending from the oil pump to the frictional members, thus controlling pressurized oil for the frictional members under the control of the TCU. When the oil pressure in the oil passages is partially changed by the solenoid valves, a plurality of valves of the oil passages are operated to control the oil pressure acting on the frictional members. Therefore, the frictional members control the gears of the change gear mechanism in accordance with the oil pressure acting on the frictional members.

FIG. 6 shows the construction of a typical hydraulic control device for 4-stage automatic transmissions.

As shown in the drawing, the typical hydraulic control device for automatic transmissions includes a manual valve 52, an SCV (Shift Control Valve), a reducing valve 53 and a PCV (Pressure Control Valve). The manual valve 52 is operated in conjunction with a gear shifting lever and receives pressurized oil from both an oil pump 50 and a regulator valve 51. The SCV selectively generates an oil pressure corresponding to one of the 1st to 4th stages in response to the pressure from the manual valve 52, thus setting a desired stage. The reducing valve 53 generates a stable reference, control pressure for controlling the valve spools of the valves, which are controlled by solenoid valves. Meanwhile, the valve spool of the PCV is controlled by the control pressure of the reducing valve 53 so that the PCV generates a control pressure for allowing the frictional members of the change gear mechanism to be smoothly operated during a shifting operation.

The hydraulic control device also includes two SCSVs (Shift Control Solenoid Valves): an SCSV-A and an SCSV-B, and a PCSV (Pressure Control Solenoid Valve). The two SCSVs commonly control the SCV under the control of the TCU, while the PCSV controls the PCV.

An N-D control valve 54 is to prevent any shifting shock during an N-D shifting action of the gear shifting lever, while an N-R control valve 55 is to prevent any shifting shock during an N-R shifting action of the gear shifting lever. The hydraulic control device also has an 1-2 shift valve 56. The valve spool of the 1-2 shift valve 56 is operated by either the 2nd-stage or reverse-stage pressure applied thereto through the 2nd-stage oil passage of the SCV, thus controlling the oil passages for both the SA (Servo Apply) part of the quick-down brake and the low-reverse brake.

The hydraulic control device further includes a 2-3/4-3 shift valve 57, of which the valve spool is connected to the 3rd and 4th-stage oil passages from the SCV at its both ends. In a 3rd-stage, the valve spool of the above valve 57 is operated by the 3rd-stage pressure of the 3rd-stage oil passage, thus allowing the control pressure of the PCV to pass through the 1-2 shift valve 56 prior to controlling both the SR (Servo Release) part of the quick-down brake and the front clutch. Meanwhile, in a 4th-stage, the valve spool of the shift valve 57 is operated by the 4th-stage pressure of the 4th-stage oil passage, thus allowing the control pressure to be released from both the SR part of the quick-down brake and the front clutch through the valve 57.

The rear clutch is controlled by a spring-biased RCEV (Rear Clutch Exhaust valve). In a 1st, 2nd or 3rd-stage with the gear shifting lever being positioned in the D-range, the RCEV is biased by its spring installed at one end thereof, thus applying a drive pressure to the rear clutch. Meanwhile, when a 4th-stage pressure acts on the opposite end of the RCEV, the RCEV stops the pressure for the rear clutch and allows the pressure of the rear clutch to be released. When the 4th-stage pressure is removed from the RCEV, the valve spool of the RCEV is operated by the oil pressure from the 2-3/4-3 shift valve 57, thus applying the oil pressure to the rear clutch.

The hydraulic control device also includes an end clutch valve 58. The valve spool of the above valve 58 is operated by the 2nd or 3rd-stage pressure from the SCV or by the control pressure from the 2-3/4-3 shift valve 57, thus controlling the oil pressure for the end clutch.

The operation of the above hydraulic control device of the automatic transmission will be described hereinbelow, with the device performing an R-N-D shifting operation.

When the gear shifting lever is positioned in the R-range, the reverse-stage pressure from the manual valve 52 is applied to the regulator valve 51, thus allowing the regulating valve 51 to regulate the oil pressure. The oil pressure thus becomes slightly higher than a Drive-stage pressure and is suitable for a reverse stage. The regulated oil pressure of the regulator valve 51 is, thereafter, applied to both the SR part of the quick-down brake and the front clutch through the 2-3/4-3 shift valve 57. The regulated oil pressure is also applied to the low-reverse brake through in the order of the N-R control valve 55 and the 1-2 shift valve 56. Therefore, both the front clutch and the low-reverse brake are operated, while the change gear mechanism forms a speed change ratio suitable for the reverse stage.

When a driver shifts the gear shifting lever from the R-range into the D-range with the lever passing through the N-range, the manual valve 52 releases the pressure from the reverse-stage pressure passage, while providing a control pressure for the regulator valve 51, thus forming a line pressure. The manual valve 52 also provides a drive pressure for the hydraulic circuit.

When the reverse-stage pressure is released as described above, the pressurized oil of both the front clutch and the SR part of the quick-down brake is drained through in the order of the 2-3/4-3 shift valve 57 and an orifice "O". Meanwhile, the pressurized oil of the low-reverse brake in the above state is drained through the 1-2 shift valve 56.

When the gear shifting lever is positioned in the P, R or N-range, the SCSV-A is turned on with the SCSV-B being turned off. Therefore, the drive pressure from the manual valve 52 allows the SCV to instantaneously generate a 2nd-stage pressure. The 2nd-stage pressure from the SCV actuates both the 1-2 shift valve 56 and the end clutch valve 58.

Meanwhile, the TCU in the above state controls the PCSV so that the drive pressure from the manual valve 52 is controlled when it passes through the PCV prior to being applied to the rear clutch through the N-D control valve 54. The N-D control valve 54 also allows the drive pressure from the manual valve 52 to be applied to the SA part of the quick-down brake through the 1-2 shift valve 56.

Of course, when a predetermined time is elapsed after the starting of a gear shifting action, the increased oil pressure for the rear clutch operates the valve spool of the N-D control valve 54, thus allowing the pressure from the PCV to be applied to the SA part of the quick-down brake. On the other hand, the drive pressure from the manual valve 52 is also applied to the rear clutch through a check valve "C", which is connected to the N-D control valve 54 in parallel. In the above state, the TCU checks the shifting operation and gradually removes the 2nd-stage pressure by turning on the SCSV-A, thus releasing the SA pressure and setting the speed stage into the lst-stage of the D-range.

When the pressurized oil is drained from both the front clutch and the SR part of the quick-down brake through the 2-3/4-3 shift valve 57 in the R-N shifting operation, the oil is controlled by the orifice "O", thus being slowly drained without generating any shifting shock.

However, the above hydraulic control device is problematic in that the SA pressure may give a negative effect to the SR pressure during an R-N-D shifting operation, thus causing the SR pressure to partially remain in the SR part of the quick-down brake during the R-N-D shift operation. The remaining SR pressure acts on the front clutch, which communicates with the SR part of the quick-down brake. Therefore, the hydraulic control device unexpectedly allows both the front clutch and the rear clutch to be actuated at the same time, causing a tie-up shock. Due to such a tie-up shock, the hydraulic control device regrettably increases the shifting shock and deteriorates the shifting sense during such an R-N-D shifting operation.

SUMMARY OF THE INVENTION

Accordingly, the present invention has been made keeping in mind the above problems occurring in the prior art. An object of the present invention is to provide a hydraulic control device for 4-stage automatic transmissions which slowly releases the front clutch pressure during an N-D shifting operation and quickly releases the front clutch pressure during an R-N-D shifting operation, thus smoothly performing the R-N-D shifting operation without generating any shifting shock.

In order to accomplish the above object, the present invention provides a hydraulic control device for automatic transmissions, comprising a manual valve operated in conjunction with a lever shifting action of a gear shifting lever; an SCV selectively generating an oil pressure corresponding to one of 1st to 4th-stage speed modes in response to a pressure from the manual valve; a PCV generating a control pressure for allowing a plurality of frictional members of a change gear mechanism to be smoothly operated during a shifting operation, the frictional members including both a front clutch and a quick-down brake; an N-D control valve controlling the control pressure from the PCV, thus preventing any shifting shock during an N-D shifting operation; and an oil passage connected to both the front clutch and an SR part of the quick-down brake, thus allowing pressurized oil to be fed into or discharged from both the front clutch and the SR part through the same passage, further comprising: a valve means for quickly discharging the pressurized oil from the front clutch during an R-N-D shifting operation, with a valve spool of the valve means being controlled by a drive pressure from the manual valve or the control pressure output from the PCV and controlled by the N-D control valve, the valve means being comprised of: a valve body including: a first port adapted for receiving the drive pressure from the manual valve; a second port adapted for receiving the control pressure, output from the PCV and controlled by the N-D control valve; a third port connected to the oil passage; and a fourth port adapted for draining pressurized oil from the valve means; and the valve spool being movably received in the valve spool and being normally biased by a spring and being selectively biased by the drive pressure or the control pressure, the valve spool including: a first land selectively actuated by the drive pressure received through the first port; and a second land normally biased by the spring and selectively actuated by the control pressure received through the second port, thus selectively opening the fourth port.

BRIEF DESCRIPTION OF THE ACCOMPANYING DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
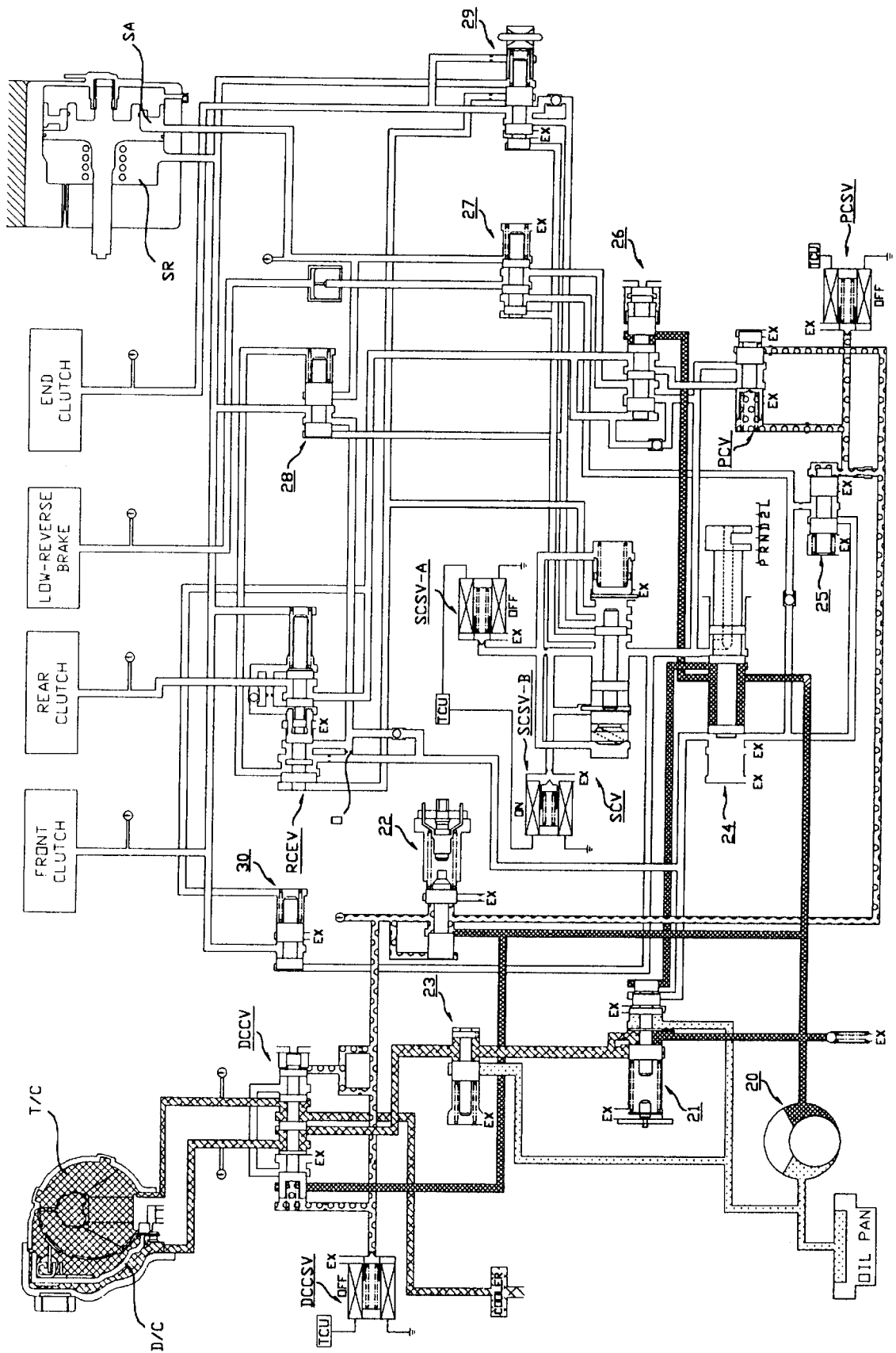
FIG. 1 is a circuit diagram showing the construction of a hydraulic control device for automatic transmissions in accordance with the preferred embodiment of the present invention.

FIG. 1 is a circuit diagram showing the construction of a hydraulic control device for automatic transmissions in accordance with the preferred embodiment of this invention. As shown in the drawing, the hydraulic control device includes an engine-operated oil pump 20, which outputs pressurized oil.

The hydraulic control device also includes a plurality of valves: a regulator valve 21, a reducing valve 22, a torque converter valve 23, a DCCV (Damper Clutch Control Valve), a DCCSV (Damper Clutch Control Solenoid Valve), a manual valve 24, an N-R control valve 25, a PCV (Pressure Control Valve), A PCSV (Pressure Control Solenoid Valve), an SCV (Shift Control Valve), an N-D control valve 26, an 1-2 shift valve (27), a 2-3/4-3 shift valve 28, an RCEV (Rear Clutch Exhaust Valve), and an end clutch valve 29.

The regulator valve 21 regulates the pressurized oil from the oil pump 20, thus providing an oil pressure corresponding to a drive stage or a reverse stage.

The reducing valve 22 generates an oil pressure of lower than that of the regulator valve 21, thus providing a stable reference control pressure for the solenoid valves.

The torque converter valve 23 controls the oil pressure from the regulator valve 21, thus forming a torque converter pressure required by the torque converter (T/C).

The DCCV selectively supplies the torque converter pressure (T/C pressure) of the T/C valve 23 or the pressure of the regulator valve 21 to the torque converter, thus actuating the damper clutch (D/C) of the torque converter.

The DCCSV controls the DCCV under the DUTY control of the TCU, which controls the hydraulic control device in response to the speed of a car, the opening area of a throttle valve and running conditions of the car.

The manual valve 24 selects one of the P, R, N, D, 2 and L ranges in accordance with a lever shifting motion of a driver, thus allowing the pressurized oil of the regulator valve 21 with an oil pressure corresponding to one of the N, D and R modes.

The N-R control valve 25 controls the reverse-stage pressure from the manual valve 24 prior to feeding the pressure to the low-reverse brake, thus preventing any shifting shock during a reverse stage.

The PCV receives the drive-stage pressure from the manual valve 24 and the reference control pressure from the reducing valve 22. Upon receiving the pressures from the two valves 22 and 24, the valve spool of the PCV is duty-controlled by the reference control pressure of the reducing valve 22 so that the PCV generates a control pressure for appropriately feeding the drive-stage pressure from the manual valve 24 to the frictional members of the change gear mechanism. Meanwhile, the PCSV duty-controls the PCV under the control of the TCU.

The SCV is operated conjunction with the two SCSVs (Shift Control Solenoid Valves): an SCSV-A and an SCSV-B, which are turned on or off by the TCU. The SCV thus selectively generates an oil pressure corresponding to one of the 1st to 4th stages in response to the pressure from the manual valve 24 and sets a desired stage.

The N-D control valve 26 is to prevent any shifting shock during an N-D shifting action of the gear shifting lever.

The valve spool of the 1-2 shift valve 27 is operated by either the 2nd-stage or reverse-stage pressure applied thereto through the 2nd-stage oil passage of the SCV, thus controlling the oil passages for both the SA (Servo Apply) part of the quick-down brake and the low-reverse brake.

The valve spool of the 2-3/4-3 shift valve 28 is connected to the 3rd and 4th-stage oil passages from the SCV at its both ends. In a 3rd-stage, the valve spool of the above valve 28 is operated by the 3rd-stage pressure of the 3rd-stage oil passage, thus allowing the control pressure of the PCV to pass through the 1-2 shift valve 27 prior to controlling both the SR (Servo Release) part of the quick-down brake and the front clutch. Meanwhile, in a 4th-stage, the valve spool of the shift valve 28 is operated by the 4th-stage pressure of the 4th-stage oil passage, thus allowing the control pressure to be released from both the SR part of the quick-down brake and the front clutch through the valve 28.

The spring-biased RCEV controls the pressurized oil for the rear clutch. In a 1st, 2nd or 3rd-stage with the gear shifting lever being positioned in the D-range, the RCEV is biased by its spring installed at one end thereof, thus applying a drive pressure to the rear clutch. Meanwhile, when a 4th-stage pressure acts on the opposite end of the RCEV, the RCEV stops the pressure for the rear clutch and allows the pressure of the rear clutch to be released. When the 4th-stage pressure is removed from the RCEV, the valve spool of the RCEV is operated by the oil pressure from the 2-3/4-3 shift valve 28, thus applying the oil pressure to the rear clutch.

The end clutch valve 29 controls the pressurized oil for the end clutch. That is, the valve spool of the end clutch valve 29 is operated by the 2nd or 3rd-stage pressure from the SCV or by the control pressure from the 2-3/4-3 shift valve 28, thus controlling the oil pressure for the end clutch.

The hydraulic control device also includes a valve means 30, of which the valve spool is normally biased by a spring and selectively controlled by the drive pressure from the manual valve 24 or the control pressure, which is output from the PCV and is controlled by the N-D control valve 26. The valve means 30 thus quickly releases the front clutch pressure during an R-N-D shifting operation.

Figure 2F:
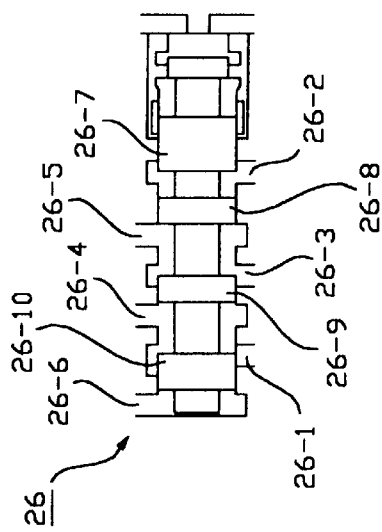
FIGS. 2A to 2N are views showing the construction of a plurality of valves included in the hydraulic control device of FIG. 1.
Figure 2H:
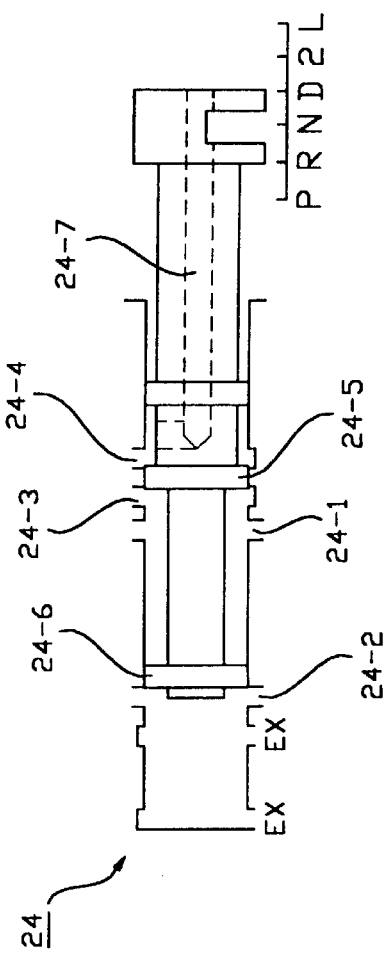
Figure 2E:
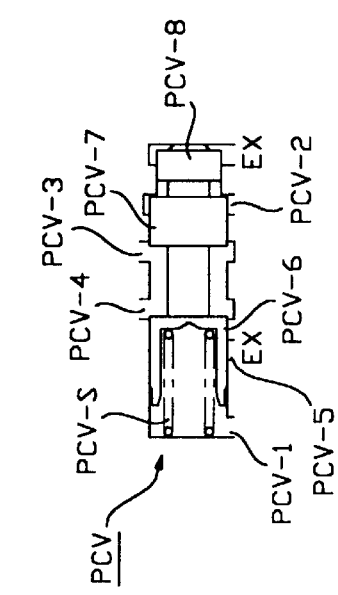
Figure 2G:
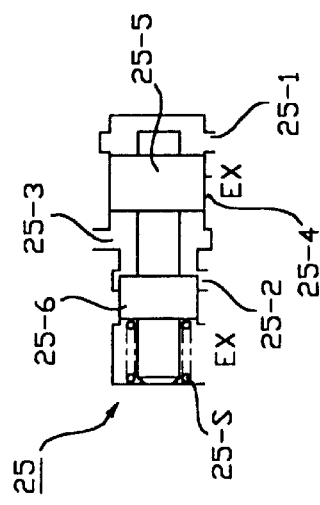
Figure 2K:
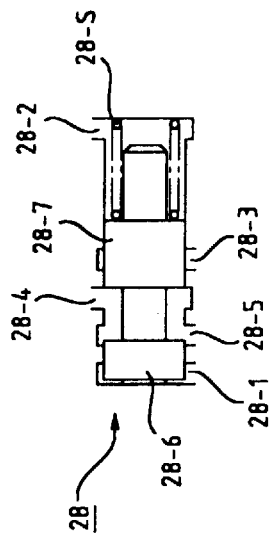
Figure 2I:
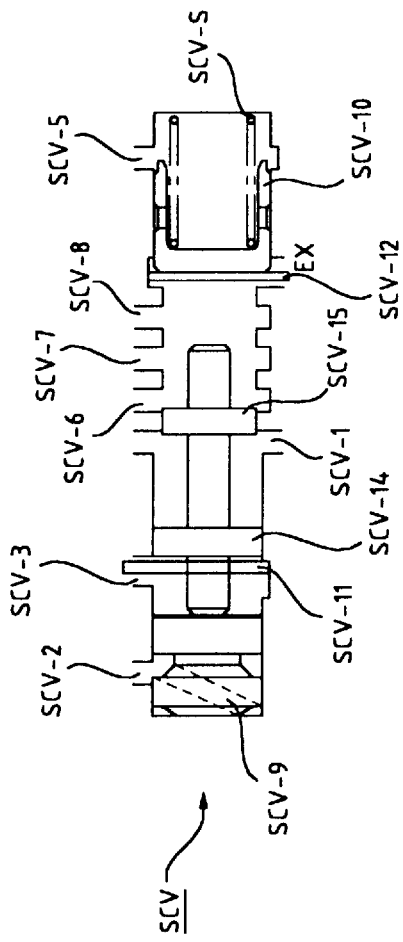
Figure 2J:
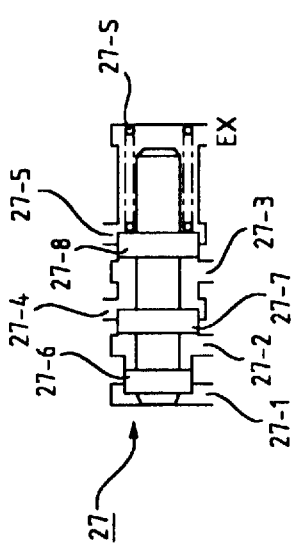
Figure 2L:
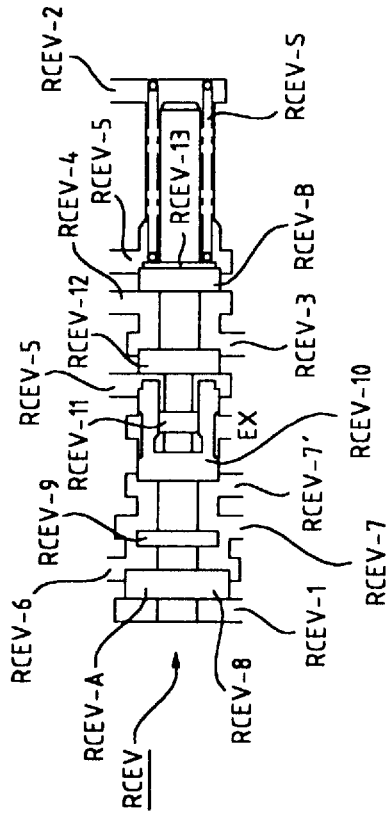
Figure 2N:
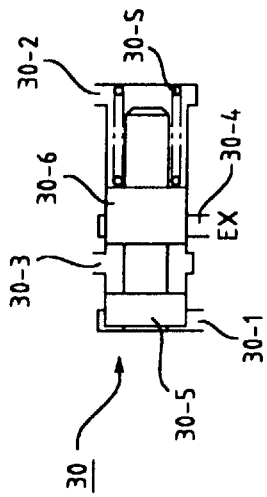

The construction of the above-mentioned valves is shown in FIGS. 2A to 2N.

FIG. 2A shows the construction of the regulator valve 21. As shown in the drawing, the regulator valve 21 is comprised of a valve body with a plurality of ports. That is, the regulator valve 21 includes 1st to 6th ports. The 1st port 21-1 communicates with the oil pump 20. The 2nd and 3rd ports 21-2 and 21-3 respectively allow the N-mode pressure and R-mode pressure of the manual valve 24 to pass through. The 4th and 5th ports 21-4 and 21-5 commonly communicate with the torque converter valve 23. Meanwhile, the 6th port 21-6 allows the pressurized oil to be returned to the inlet port of the oil pump 20.

In the valve body of the regulator valve 21, the valve spool is biased by an adjustable spring 21-S at a position opposite to the 2nd and 3rd ports 21-2 and 21-3. The valve spool of the regulator valve 21 also includes a plurality of lands: 1st to 5th lands. The 1st land 21-7 is operated by the pressure from the 2nd port 21-2 and cooperates with the spring 21-S, thus maintaining the balanced position of the valve spool and generating an oil pressure corresponding to the N or D mode. The 2nd land 21-8 has a pressure area of larger than that of the 1st land 21-7 and actuates the valve spool using the pressure from the 3rd port 21-3, thus forming a pressure corresponding to the R mode. Meanwhile, the 3rd to 5th lands 21-9, 21-10, 21-11 appropriately control the 1st, 4th, 5th and 6th ports 21-1. 21-4, 21-5, 21-6, thus providing appropriate pressures for both the torque converter valve 23 and the manual valve 24 in accordance with running conditions of the engine.

FIG. 2B shows the construction of the torque converter valve 23. As shown in the drawing, the valve body of the torque converter (T/C) valve 23 includes 1st to 3rd ports 23-1, 23-2, 23-3. The 1st port 23-1 allows the pressurized oil from the 4th and 5th ports 21-4 and 21-5 of the regulator valve 21 to be fed into the T/C valve 23. The 2nd port 23-2 is connected to the DCCV, while the 3rd port 23-3 is connected to the inlet port of the oil pump 20.

In the valve body of the T/C valve 23, the valve spool is biased by a spring 23-S at one end. The valve spool of the T/C valve 23 also includes 1st and 2nd lands 23-4, 23-5. The 1st land 23-4 is formed at a position opposite to the spring 23-S and has an oil passage, which allows the pressurized oil from the 1st port 23-1 to pass through. The 1st land 23-4 thus provides an oil pressure, opposing the spring force of the spring 23-S, to the valve spool. The 2nd land 23-5 selectively opens the 3rd port 23-3 in order to control the internal pressure of the valve 23, when the pressure of the 1st port 23-1 exceeds a reference pressure.

FIG. 2C shows the construction of the DCCV. As shown in the drawing, the valve body of the DCCV includes 1st to 8th ports DCCV-1 to DCCV-8. The 1st and 2nd ports DCCV-1, DCCV-2 receive the reference control pressure from the reducing valve 22 and cooperate with a spring DCCV-S, thus controlling the valve spool of the DCCV. The 3rd port DCCV-3 receives the pressure from the regulator valve 21, while the 4th port DCCV-4 receives the controlled pressure from the T/C valve 23. The 5th port DCCV-5 feeds the pressure of the 4th port DCCV-4 to the torque converter T/C when the damper clutch D/C is turned off. The 6th port DCCV-6 recovers the pressurized oil from the torque converter when the damper clutch is turned off. Meanwhile, when the damper clutch is turned on, the 6th port DCCV-6 feeds the pressurized oil to the torque converter. The 7th and 7'th ports DCCV-7, DCCV-7' feed the pressurized oil of the regulator valve 21, which is received through the 3rd port DCCV-3, to the torque converter through the 6th port DCCV-6. The 8th port DCCV-8 is a drain port for draining the pressurized oil from the DCCV.

In the valve body of the DCCV, the valve spool includes 1st to 6th lands DCCV-9 to DCCV-14. The 1st land DCCV-9 is biased by the spring DCCV-S at a position around the 1st port DCCV-1 and selectively allows the 3rd port DCCV-3 to communicate with the 7th port DCCV-7 when the valve spool of the DCCV moves under the control of the DCCSV. The 2nd and 3rd lands DCCV-10, DCCV-11 selectively allow the 4th port DCCV-4 to communicate with the 5th port DCCV-5, thus feeding the pressurized oil from the T/C valve 23 to the torque valve when the damper clutch is turned off. The 4th land DCCV-12 is selectively operated in conjunction with the 3rd land DCCV-3 in the event of the damper clutch being turned on, thus allowing the 4th port DCCV-4 to communicate with the 8th port DCCV-8 prior to draining the pressurized oil from the torque converter valve 23. The 4th land DCCV-12 in the above state also allows the 7'th port DCCV-7' to communicate with the 6th port DCCV-6, thus feeding the pressurized oil from the 7th port DCCV-7 to the torque converter. The 5th and 6th lands DCCV-13, DCCV-14 allow the reference control pressure of the reducing valve 22 to appropriately act on the valve spool of the DCCV.

FIG. 2D shows the construction of the reducing valve 22. As shown in the drawing, the valve body of the reducing valve 22 includes 1st to 5th ports 22-1 to 22-5. The 1st port 22-1 receives the pressurized oil from the regulator valve 22. The 2nd port 22-2 provides a reference control pressure, which is lower than the controlled pressure from the regulator valve 21, to the DCCV, thus allowing the DCCV to be controlled by the DCCSV. The 3rd port 22-3 feeds back the discharged pressure from the 2nd port 22-2, thus providing the discharged pressure as a valve spool control pressure. The 4th port 22-4 provides a reference control pressure for both the PCV and the N-R control valve 25. The 5th port 22-5 is a drain port for draining the pressurized oil from the reducing valve 22.

In the valve body of the reducing valve 22, the valve spool is biased by an adjustable spring 22-S at one end. The valve spool of the reducing valve 22 also includes 1st and 2nd lands 22-6, 22-7. The 1st land 22-6 is formed at a position opposite to the spring 22-S and is operated by the pressurized oil fed back to the 3rd port 22-3. The 1st land 22-6 controls the opening area of the 1st port 22-1, thus controlling the pressurized oil from the regulator valve 21. The 2nd land 22-7 is biased by the spring 22-S and controls the opening area of the 5th port 22-5, thus selectively discharging surplus oil under pressure.

FIG. 2E shows the construction of the PCV. As shown in the drawing, the valve body of the PCV includes 1st to 5th ports PCV-1 to PCV-5. The 1st and 2nd ports PCV-1, PCV-2 receive the pressure from the reducing valve 22, thus controlling the valve spool of the PCV. The 3rd port PCV-3 receives the drive-stage pressure from the manual valve 24. The 4th port PCV-4 communicates with the N-R control valve 26, while the 5th port PCV-5 is a drain port for draining the pressurized oil from the PCV.

In the valve body of the PCV, the valve spool includes 1st to 3rd lands PCV-6 to PCV-8. The 1st land PCV-6 is biased by a spring PCV-S and controls the opening area of the 5th port PCV-5 using the control pressure from the PCSV. The 2nd land PCV-7 controls the opening area of the 3rd port PCV-3, thus controlling the communication area between the 3rd and 4th ports PCV-3, PCV-4. The 3rd land PCV-8 forms a valve spool control pressure, thus allowing the pressurized oil for the 2nd port PCV-2 to appropriately act on the 2nd land PCV-7.

FIG. 2F shows the construction of the N-D control valve 26. As shown in the drawing, the valve body of the N-D control valve 26 includes 1st to 6th ports 26-1 to 26-6. The 1st and 2nd ports 26-1, 26-2 receive the pressurized oil from the manual valve 24. The 3rd port 26-3 receives the controlled pressure from the PCV. The 4th port 26-4 is connected to the 1-2 shift valve 27, while the 5th port 26-5 is connected to the rear clutch through the RCEV. The 6th port 26-6 recovers the pressurized oil from the 5th port 26-5, thus providing a control pressure for the valve spool of the N-D control valve 26.

In addition, an oil passage, with a check ball "C", is connected to the 1st and 6th ports 26-1, 26-6. Therefore, the drive-stage pressure from the manual valve 24 continuously passes through the oil passage, when the pressure for the 6th port 26-6 is increased and opens the check ball "C".

In the valve body of the N-D control valve 26, the valve spool includes 1st to 4th lands 26-7 to 26-10. The 1st and 2nd lands 26-7, 26-8 are operated by the pressures from the 2nd and 6th ports 26-2, 26-6 and support the valve spool in a direction by the pressure from the manual valve 24, which passes through the 2nd port 26-2. The 3rd land 26-9 feeds the pressurized oil from the PCV to the rear clutch through the 3rd and 5th ports 26-3, 26-5 at the initial stage of an N-D shifting operation. Meanwhile, at the end stage of the N-D shifting operation, the 3rd land 26-9 allows the 3rd and 4th ports 26-3, 26-4 to communicate together, thus providing the drive-stage pressure for the rear clutch. The 4th land 26-10 operates the valve spool, which is supported by the 1st and 2nd lands 26-7, 26-8, in an opposite direction using the pressure recovered by the 6th port 26-6.

FIG. 2G shows the construction of the N-R control valve 25. As shown in the drawing, the valve body of the N-R control valve 25 includes 1st to 4th ports 25-1 to 25-4. The 1st port 25-1 receives the pressurized oil from the reducing valve 22, thus controlling the valve spool of the N-R control valve 25. The 2nd port 25-2 is connected to the reverse-stage pressure passage of the manual valve 24. The 3rd port 25-3 feeds pressurized oil to the low-reverse brake through the 1-2 shift valve 27. The 4th port 25-4 is a drain port for draining the pressurized oil from the N-R control valve 25.

In the valve body of the N-R control valve 25, the valve spool includes 1st and 2nd lands 25-5, 25-6. The 1st land 25-5 receives a valve spool control pressure from the PCSV through the 1st port 25-1 and controls the opening area of the 4th port 25-4. The 2nd land 25-6 is biased by a spring 25-S, which provides another valve spool control pressure opposite to the valve spool control pressure from the PCSV. The 2nd land 25-6 thus controls the opening area of the 2nd port 25-2.

FIG. 2H shows the construction of the manual valve 24. As shown in the drawing, the valve body of the manual valve 24 includes 1st to 4th ports 24-1 to 24-4. The 1st port 24-1 receives the pressurized oil from the regulator valve 21. The 2nd port 24-2 selectively communicates with the 1st port 24-1 in a reverse stage, thus providing pressurized oil for the regulator valve 21 and providing pressurized oil for the 2nd port 25-2 of the N-R control valve 25. The 3rd port 24-3 selectively communicates with the 1st port 24-1 in a neutral or drive stage, thus providing pressurized oil for the regulator valve 21. The 4th port 24-4 selectively provides pressurized oil for the SCV, PCV and N-D control valve 26 in a drive stage.

In the valve body of the manual valve 24, the valve spool includes 1st and 2nd lands 24-5, 24-6. The 1st and 2nd lands 24-5, 24-6 selectively connect the 1st port 24-1 to the 2nd port 24-2 in a reverse stage, to the 3rd port 24-3 in a neutral stage, and to the 3rd and 4th ports 24-3, 24-4 in a drive stage. The valve body of the manual valve 24 also includes a drain port 24-7, through which the pressurized oil is drained from the valve 24 in a parking stage.

FIG. 2I shows the construction of the SCV. As shown in the drawing, the valve body of the SCV includes a 1st port SCV-1, which receives the pressurized oil from the manual valve 24. The above valve body also includes 2nd, 3rd and 5th ports 24-2, 24-3, 24-5, which selectively form an oil passage for the valve spool in accordance with one of the 1st to 4th-stage speeds. The valve body of the SCV further includes 6th to 8th ports SCV-6, SCV-7, SCV-8 used for providing 2nd, 3rd and 4th-stage pressures.

In the valve body of the SCV, left and right hydraulic plugs SCV-9, SCV-10 are inserted into both ends of the valve body, while a valve spool is received in the middle part of the valve body. Left and right stoppers SCV-11, SCV-12 are provided between the valve spool and the left and right plugs SCV-9, SCV-10, thus limiting the movement of the valve spool in the valve body. The two stoppers SCV-11, SCV12 individually have a central opening, thus allowing both ends of the valve spool to pass through the stoppers SCV-11, SCV-12 prior to coming into contact with the two plugs SCV-9, SCV-10. The right stopper SCV-12 is biased by a spring In the valve body of the SCV, the valve spool includes 1st and 2nd lands SCV-14, SCV-15. The 1st land SCV-14 is formed at the left end portion of the valve spool, thus limiting the leftward movement of the valve spool within a predetermined range. The 2nd land SCV-15 selectively connects the 1st port SCV-1 to the 6th, 7th and 8th ports SCV-6, SCV-7, SCV-8 in that order while the speed is changed from the 2th-stage speed into the 4th-stage speed through the 3rd-stage speed. The valve spool of the SCV thus selectively allows the pressurized oil to pass through the SCV in accordance with the movements of the 1st and 2nd lands SCV-14, SCV-15.

The 2nd and 5th ports SCV-2, SCV-5 are formed on the SCV at positions around both ends of the valve spool. The 3rd and 9th ports SCV-3, SCV-9 are formed on the SCV at positions around the left and right stoppers SCV-11, SCV-12, respectively. The 1st port SCV-1 is formed on the middle portion of SCV, while the 6th, 7th and 8th port SCV-6, SCV-7, SCV-8 are orderly formed at the right of the 1st port SCV-1.

The position of the SCSV-A and SCSV-B, which are turned on or off by the TCU, is as follows. That is, the SCSV-A is mounted to an oil passage, which is commonly connected to the 1st, 2nd and 5th ports SCV-1, SCV-2, SCV-5. The SCSV-A thus controls the pressurized oil acting on the 2nd and 5th ports SCV-2, SCV-5. Meanwhile, the SCSV-B is mounted to another oil passage, which is commonly connected to the 1st and 3rd ports SCV-1, SCV-3. The SCSV-B thus controls the pressurized oil acting on the 3rd port SCV-3.

FIG. 2J shows the construction of the 1-2 shift valve 27. As shown in the drawing, the valve body of the 1-2 shift valve 27 includes 1st to 5th ports 27-1 to 27-5. The 1st port 27-1 receives the 2nd-stage pressure from the 6th port SCV-6 of the SCV. The 2nd port 27-2 is connected to the 3rd port 25-3 of the N-R control valve 25, thus receiving the reverse-stage pressure. The 3rd port 27-3 is connected to the N-D control valve 26. The 4th port 27-4 feeds the reverse-stage pressure from the 2nd port 27-2 to the low-reverse brake. The 5th port 27-5 is connected to both the 2-3/4-3 shift valve 28 and the SA part of the quick-down brake.

In the valve body of the 1-2 shift valve 27, the valve spool is biased by a spring 27-S, which is provided at a position opposite to the 1st port 27-1. The valve spool also includes 1st to 3rd lands 27-6, 27-7, 27-8. The 1st land 27-6 actuates the valve spool using the 2nd-stage pressure, which is received through the 1st port 27-1. The 2nd land 27-7 controls the communication between the 2nd and 4th ports 27-2, 27-4, while the 3rd land 27-8 controls the communication between the 3rd and 5th ports 27-3, 27-5.

FIG. 2K shows the construction of the 2-3/4-3 shift valve 28. As shown in the drawing, the valve body of the 2-3/4-3 shift valve 28 includes 1st to 5th ports 28-1 to 28-5. The 1st port 28-1 is connected to the 7th port SCV-7 of the SCV, thus receiving the 3rd-stage pressure from the 7th port SCV-7 of the SCV. The 2nd port 28-2 receives the 4th-stage pressure from the 8th port SCV-8 of the SCV through the RCEV. The 3rd port 28-3 is connected to the 5th port 27-5 of the 1-2 shift valve 27. The 4th port 28-4 is commonly connected to the front clutch, the SR part of the quick-down brake, RCEV and end clutch valve. The 5th port 28-5 is selectively connected to the 4th port 28-4, thus releasing the pressure from the valve 28. The 5th port 28-5 also receives the reverse-stage pressure from the manual valve 24.

In the valve body of the 2-3/4-3 shift valve 28, the valve spool is biased by a spring 28-S, which is provided at a position around the 2nd port 28-2. The valve spool also includes 1st and 2nd lands 28-6, 28-7. The 1st land 28-6 actuates the valve spool using the 3rd-stage pressure, which is received through the 1st port 28-1. The 1st land 28-6 also controls the opening area of the 5th port 28-5. The 2nd land 28-7 controls the communication between the 3rd and 4th ports 28-3, 28-4. The 2nd land 28-7 also actuates the valve spool using both the spring force of the spring 28-S and the 4th-stage pressure, which is received through the 2nd port 28-2.

FIG. 2L shows the construction of the RCEV. As shown in the drawing, the valve body of the RCEV includes 1st to 7'th ports RCEV-1 to RCEV-7'. The 1st port RCEV-1 is connected to the 8th port SCV-8 of the SCV and receives the 4th-stage pressure. The 2nd port RCEV-2 receives the pressure from the 2-3/4-3 shift valve 28, thus controlling the valve spool of the RCEV. The 3rd port RCEV-3 is connected to the N-D control valve 26, thus receiving the pressure for the rear clutch. The 4th port RCEV-4 is connected to the 3rd port RCEV-3 and feeds the pressurized oil for the rear clutch. The 5th and 5'th ports RCEV-5, RCEV-5' are connected to the orifice and check ball in parallel, thus slowly feeding pressurized oil for the rear clutch and quickly discharging the pressurized oil from the rear clutch when the communication between the 3rd and 4th ports RCEV-3, RCEV-4 is stopped. The 6th port RCEV-6 feeds the 4th-stage pressure, which is received through the 1st port RCEV-1, to the 2-3/4-3 shift valve 28. Meanwhile, the 7th and 7'th RCEV-7, RCEV-7' are connected to the manual valve 24, thus selectively releasing the 4th-stage pressure from the 2-3/4-3 shift valve 28 when it is necessary to release the 4th-stage pressure.

In the valve body of the RCEV, the valve spool is comprised of two spools: a 1st spool RCEV-A and a 2nd spool RCEV-B. The 1st spool RCEV-A includes 1st to 3rd lands RCEV-8 to RCEV-10. The 1st land RCEV-8 actuates the 1st valve spool RCEV-A using the 4th-stage pressure from the 1st port RCEV-1 and controls the communication between the 1st and 6th ports RCEV-1, RCEV-6. The 2nd land RCEV-9 controls the communication between the 6th and 7'th ports RCEV-6, RCEV-7'. The 3rd land RCEV-10 movably receives one end of the 2nd spool RCEV-B. Meanwhile, the 2nd spool RCEV-B includes 4th to 6th lands RCEV-11 to RCEV-13. The 4th land RCEV-11 is movably received into the 3rd land RCEV-10. The 5th and 6th lands RCEV-12, RCEV-13 commonly control the communication between the 3rd and 5th ports RCEV-3, RCEV-5 and control bypass oil, which passes through the 5th and 5'th ports RCEV-5, RCEV-5'. The 6th land RCEV-13 is biased by a spring RCEV-S and actuates the 2nd spool RCEV-B using the pressurized oil, which is received from the 2-3/4-3 shift valve 28 through the 2nd port RCEV-2.

Figure 2M:
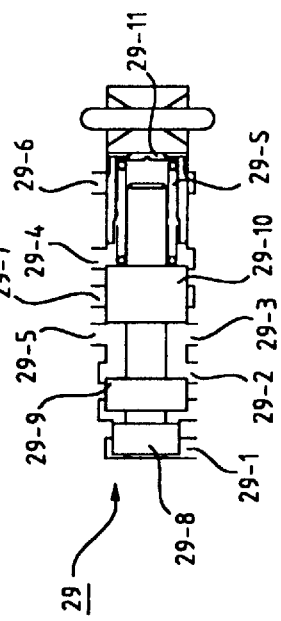

FIG. 2M shows the construction of the end clutch valve 29. As shown in the drawing, the valve body of the end clutch valve 29 includes 1st to 7th ports 29-1 to 29-7. The 1st port 29-1 receives the 2nd-stage pressure from the SCV, while the 2nd and 3rd ports 29-2, 29-3 receive the 3rd-stage pressure. The 4th port 29-4 receives the pressure from the 2-3/4-3 shift valve 28, thus controlling the movement of the valve spool of the end clutch valve 29. The 5th port 29-5 feeds the pressurized oil from the 2nd and 3rd ports 29-2, 29-3 to the end clutch. The 6th port 29-6 selectively recovers the pressurized oil, which is fed from the 5th port 29-5 to the end clutch. The 6th port 29-6 maintains the position of the valve spool of the end clutch valve 29, thus allowing the valve 29 to continuously feed the pressurized oil to the end clutch in the event of changing the speed from the 3rd-stage speed mode into the 4th-stage speed mode. The 7th port 29-7 selectively receives the 4th-stage pressure from the SCV when the pressure from the 2nd and 3rd ports 29-2, 29-3 is unexpectedly prevented from being fed to the end clutch through the 5th port 29-5 in the event of changing the speed into the 4th-stage speed mode.

In the valve body of the end clutch valve 29, the valve spool includes 1st to 3rd lands 29-8 to 29-10. The 1st land 29-8 actuates the valve spool of the valve 29 using the 2nd-stage pressure, which is received through the 1st port 29-1. The 2nd land 29-9 controls the communication between the 2nd, 3rd and 5th ports 29-2, 29-3, 29-5. Meanwhile, the 3rd land 29-10 is biased by a spring 29-S and controls the communication between the 5th and 7th ports 29-5, 29-7. In order to support the valve spool using the pressure of the 6th port 29-6, a plug 29-11 is provided in the valve 29 at a position around the 3rd land 29-10.

FIG. 2N shows the construction of the valve means 30. As shown in the drawing, the valve body of the valve means 30 includes 1st to 4th ports 30-1 to 30-4. The 1st port 30-1 receives the drive pressure from the manual valve 24. The 2nd port 20-2 receives the control pressure, which is output from the PCV and is controlled by the N-D control valve 26. The 3rd port 30-3 is connected to an oil passage, which connects the front clutch to the SR part of the quick-down brake. Meanwhile, the 4th port 30-4 is a drain port for draining the pressurized oil from the valve means 30.

In the valve body of the valve means 30, the valve spool is biased by a spring 30-S, which is provided at a position around the 2nd port 30-2. The valve spool also includes 1st and 2nd lands 30-5, 30-6. The 1st land 30-5 is actuated by the drive pressure, which is received through the 1st port 30-1. The 2nd land 30-6 is biased by the spring 30-S and is actuated by the control pressure, which is received through the 2nd port 30-2. The 2nd land 30-6 thus selectively opens the 4th port 30-4.

The operational effect of the above hydraulic control device for automatic transmissions will be described hereinbelow.

Figure 3:
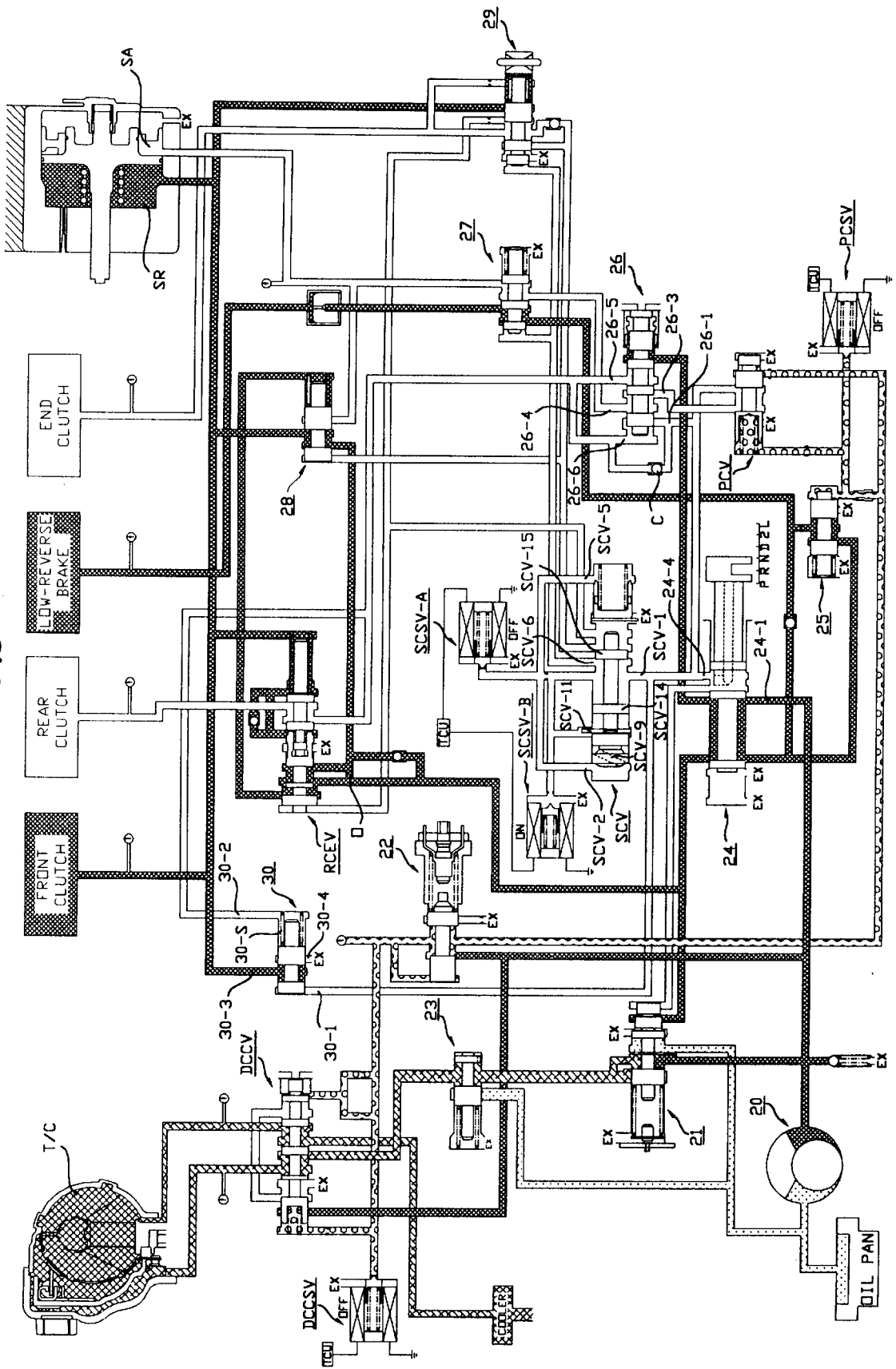
FIG. 3 is a circuit diagram showing the operation of the hydraulic control device of FIG. 1 when the device is in an R-range.
Figure 4:
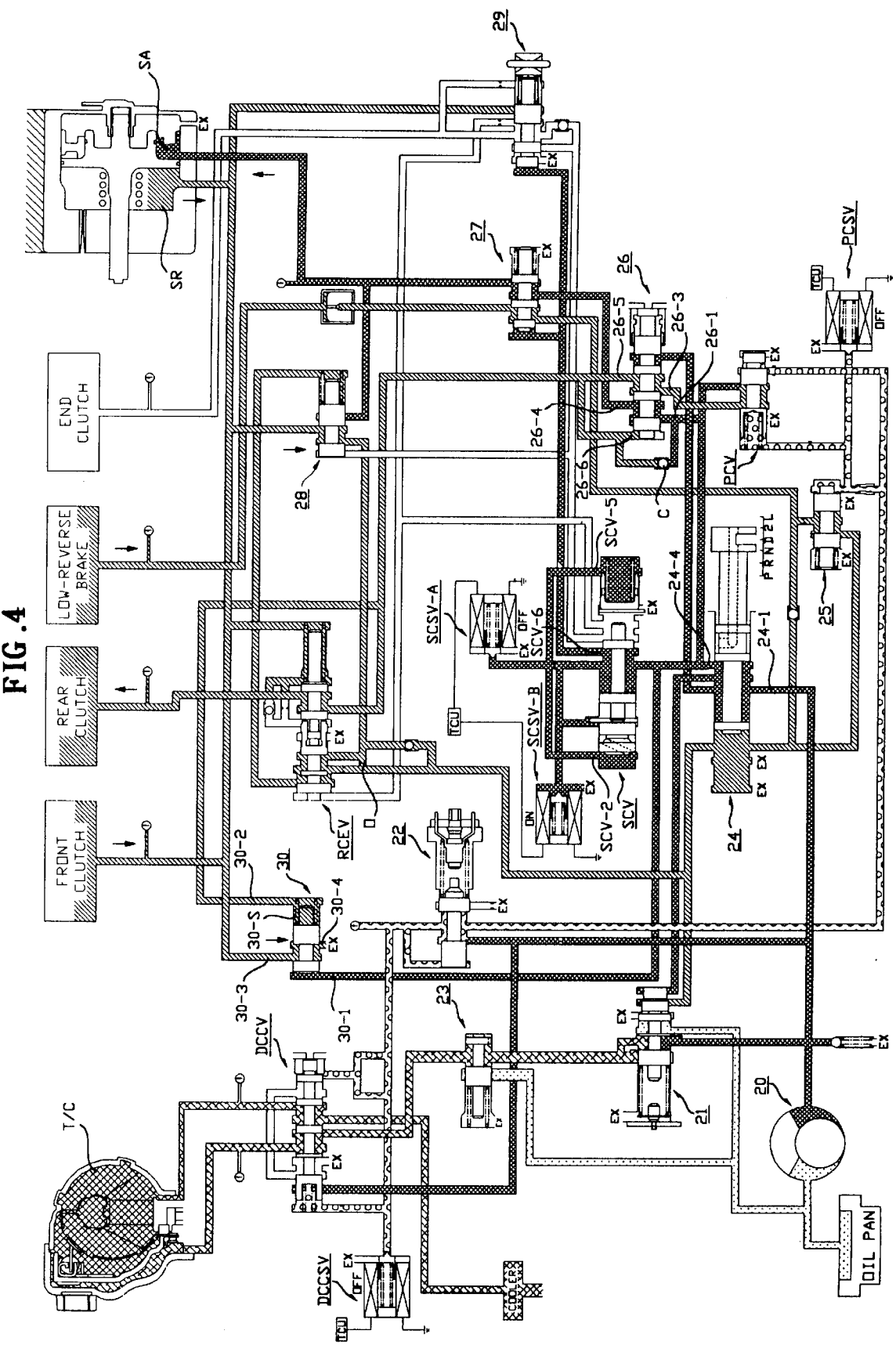
FIG. 4 is a circuit diagram showing the operation of the hydraulic control device of FIG. 3 when the device performs an R-N-D shifting operation.
Figure 5:
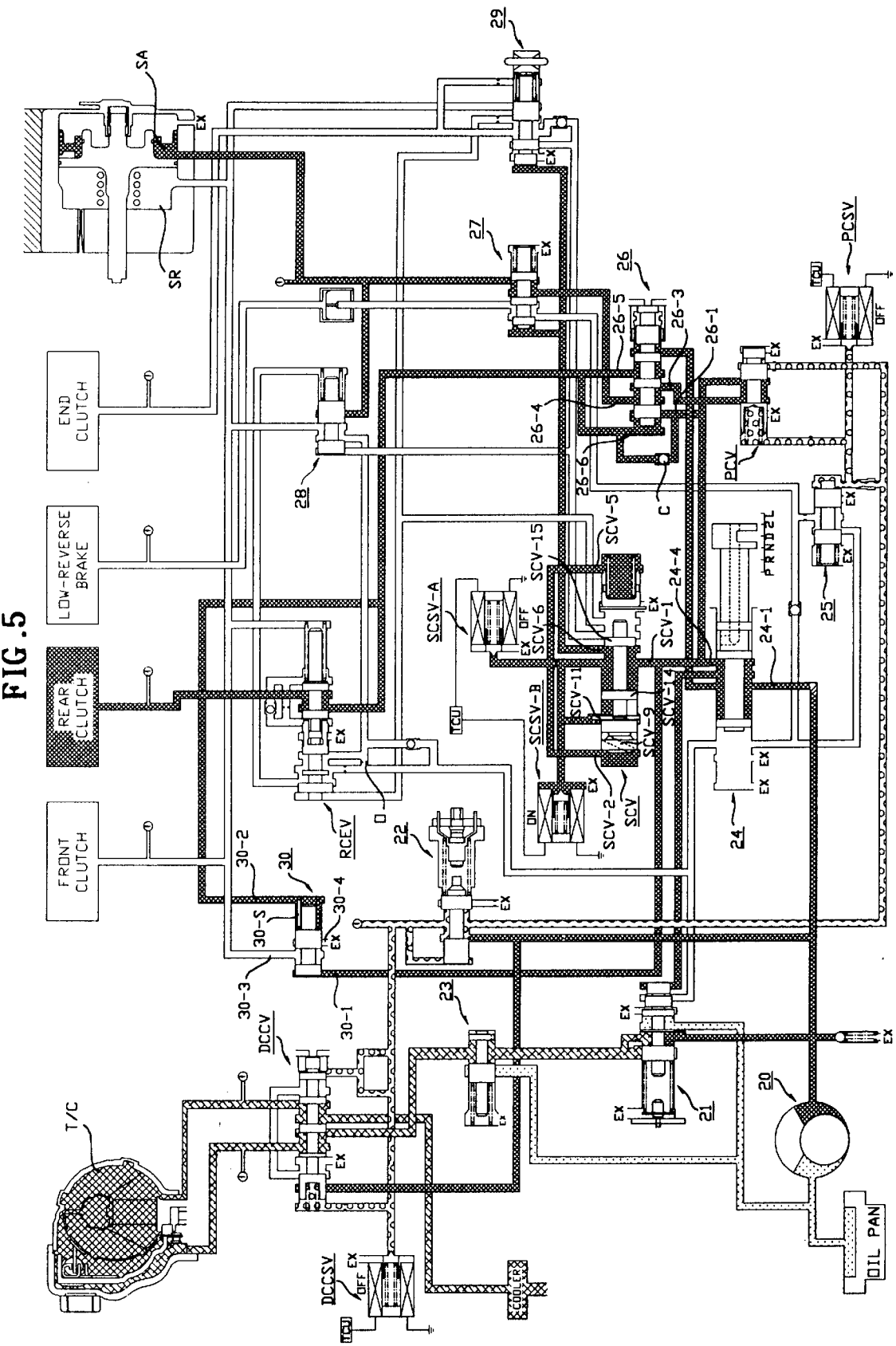
FIG. 5 is a circuit diagram of the hydraulic control device of FIG. 4 when the device completely changes the speed mode into a D-range mode.
Figure 6:
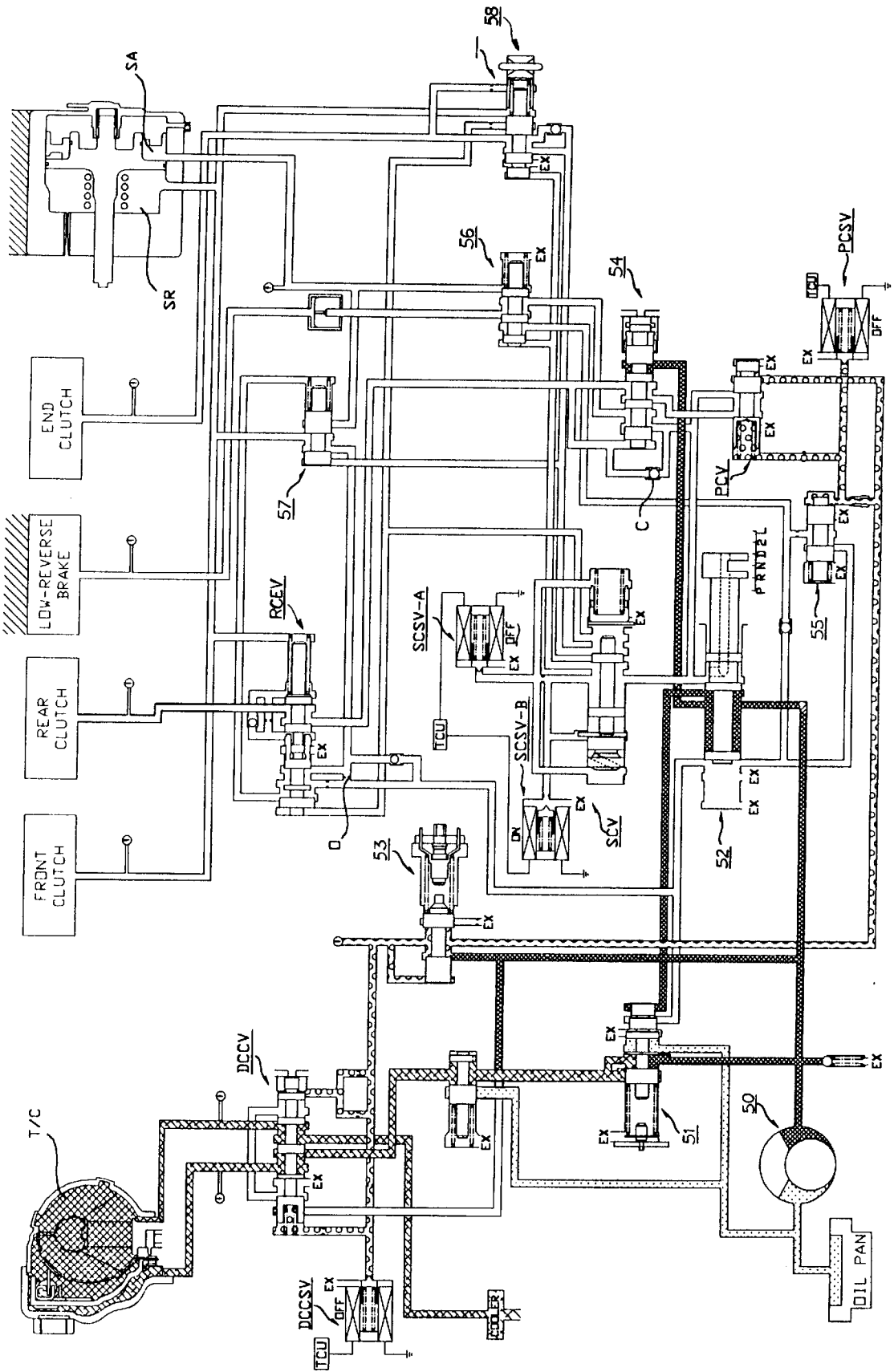
FIG. 6 is a circuit diagram showing the construction of a typical hydraulic control device for automatic transmissions.

When a driver shifts the gear shifting lever from the R-range into the D-range as shown in FIG. 3, the 4th port 24-4 of the manual valve 24 communicates with the 1st port 24-1, thus forming a drive pressure. The drive pressure of the manual valve 24 passes through the SCV, PCV and N-D control valves 26 in that order prior to being fed into both the rear clutch and the SR part of the quick-down brake. Thus, the change gear mechanism of the transmission performs a shifting operation as shown in FIG. 4 and changes the operational mode into the drive mode as shown in FIG. 5.

In the above shifting operation, the pressure from the manual valve 24 is fed into the 2nd and 5th ports SCV-2, SCV-5 of the SCV since the SCSV-A is turned on with the SCSV-B being turned off in the same manner as expected in the event of the shifting lever being positioned at the P, R or N-range. Therefore, the pressure, which is received through the 2nd port SCV-2, fully biases the left plug SCV-9 to the left stopper SCV-11, thus bringing the plug SCV-9 into close contact with the stopper SCV-11. Meanwhile, the pressure, which is received through the 1st port SCV-1, biases the valve spool to the left due to the difference in the pressure acting area between the 1st and 2nd lands SCV-14, SCV-15, thus allowing the 6th port SCV-6 to communicate with the 1st port SCV-1. Therefore, the SCV feeds the 2nd-stage pressure, which is received through the 6th port SCV-6, to both the 1-2 shift valve 27 and the end clutch valve 29.

Meanwhile, the pressurized oil, which is fed from the manual valve 24 to the PCV, is duty-controlled by the PCSV, thus passing through both the N-D control valve 26 and the RCEV prior to being fed into the rear clutch at the initial stage of the shifting operation. When the N-D control valve 26 is closed, the pressurized oil is fed into the SA part of the quick-down brake through the 1-2 shift valve 27.

In the N-D control valve 26 at the initial stage of the shifting operation, the valve spool is actuated by the pressure, which is recovered through the 6th port 26-6. The communication between the 1st and 4th ports 26-1, 26-4 and between the 3rd and 5th ports 26-3, 26-5 is thus stopped, while the 3rd and 4th ports 26-3, 26-4 communicate together. Therefore, the pressure, which is fed from the N-D control valve 26 to the rear clutch through the 3rd and 5th ports 26-3, 26-5, is substituted with the drive pressure, which bypasses through the oil passage having the check ball "C". In addition, the 3rd port 26-3 communicates with the 4th port 26-4, thus allowing the control pressure from the PCV to be fed into the SA part of the quick-down brake through the 1-2 shift valve 27. Therefore, the TCU controls the SA part of the quick-down brake through the PCSV and PCV.

In the above shifting operation, the drive pressure from the manual valve is directly applied to the 1st port 30-1 of the valve means 30, which is the important element of this invention, at the initial stage of the shifting operation as shown in FIG. 4. Meanwhile, the control pressure from the PCV is applied to the 2nd port 30-2 of the valve means 30 through the N-D control valve 26. Therefore, the valve spool of the valve means 30 moves while overcoming the spring force of the spring 30-S, thus allowing the 3rd and 4th ports 30-3, 30-4 to communicate together. The valve means 30 thus allows the pressurized oil to be quickly discharged from the front clutch.

When the pressure of the PCV, which passes through the 2nd port 30-2, is substituted with the drive pressure by the N-D control valve 26 during the shifting operation, the valve spool of the valve means 30 is actuated by the spring 30-S as shown in FIG. 5, thus stopping the communication between the 3rd and 4th ports 30-3, 30-4. The valve means 30 is, therefore, brought into a standby state for another shifting operation.

Of course, the valve means 30 in an R-N shifting operation is free from any pressure for controlling the valve spool as shown in FIG. 3. Therefore, the valve means 30 is not operated during such an R-N shifting operation. In this case, the pressure from the front clutch along with the pressure from the SR part of the quick-down brake is slowly released through both the 2-3/4-3 shift valve 28 and the orifice "O", thus effectively preventing any shifting shock during an R-N shifting operation as expected in the prior art device.

Therefore, the valve means 30 of this invention is exclusively operated during an R-N-D shifting operation without giving any negative effect to another shifting operation, thus quickly releasing the pressure from the front clutch during such an R-N-D shifting operation.

As described above, the present invention provides a hydraulic control device for automatic transmissions. The control device of this invention includes a valve means, of which the valve spool is selectively actuated by a drive pressure, the spring force of a valve spring or a control pressure from the PCV, with the control pressure being used in event of an R-N-D shifting operation. The hydraulic control device of this invention thus slowly releases the front clutch pressure during an N-D shifting operation and quickly releases the front clutch pressure during an R-N-D shifting operation, thus smoothly performing the R-N-D shifting operation without generating any shifting shock.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hydraulic control device for automatic transmissions comprising, an oil pump outputting pressurized oil:

a torque converter transmitting outpour power of an engine to an speed change gear mechanism and including a damper clutch;

a plurality of friction members including a front clutch, a rear clutch, a low-reverse brake, an end clutch, and a quick-down brake, and controlling gears of the speed change gear mechanism in accordance with the pressurized oil;

a regulator valve regulating the pressurized oil from the oil pump, thus providing an oil pressure corresponding to a drive stage or a reverse stage;

a reducing valve generating an oil pressure of lower than that of the regulator valve, thus providing a stable reference control pressure solenoid valves;

a torque converter valve controling the oil pressure from the regulator valve, thus forming a pressure required by the torque converter;

a DCCV(Damper Clutch Control Valve) selectively supplying the pressure of a torque converter valve or the pressure of the regulator valve to the torque converter, thus actuating the damper clutch of the torque converter;

a manual valve selecting one of the P, R, N, D, 2 and L ranges in accordance with a lever shifting motion of a driver, thus allowing the pressurized oil of the regulator valve with an oil pressure corresponding to one of the N, D and R modes;

a N-R control valve controlling the reverse-stage pressure from the manual valve prior to feeding the pressure to the low-reverse brake, thus preventing any shifting shock during a reverse stage;

a PCV(Pressure Control Valve) generating a control pressure for appropriately feeding the drive-stage pressure from the manual valve to the frictional members;

a SCV(Shift Control Valve) generating an oil pressure corresponding to one of the 1st to 4th stages in response to the pressure from the manual valve and setting a desired stage;

a N-D control valve preventing any shifting shock during an N-D shifting action of the gear shifting lever;

a 1-2 shift valve operated by either the 2nd-stage or reverse-stage pressure applied thereto through the 2nd-stage oil passage of the SCV, so as to control the oil passages for both the servo apply part of the quick-down brake and the low-reverse brake;

a 2-3/4-3 shift valve allowing the control pressure of the PCV to pass through the 1-2 shift valve prior to controlling both the servo release part of the quick-down brake and the front clutch in a 3rd-stage and allowing the control pressure to be released from both the servo release part of the quick-down brake and the front clutch in a 4th-stage;

a end clutch valve operated by the 2nd or 3rd-stage pressure from the SCV or by the control pressure from the 2-3/4-3 shift valve, so as to control the oil pressure for the end clutch; and valve means, for quickly discharging the pressurized oil from said front clutch during an R(reverse)-N(neutral)-D (drive) shifting operation, with a valve spool of said valve means being controlled by a drive pressure from said manual valve or the control pressure output from said PCV and controlled by said N-D control valve.

2. The hydraulic control device for automatic transmission according to claim 1, wherein said valve means comprises, a valve body including:
  a first port adapted for receiving the drive pressure from said manual valve;
  a second port adapted for receiving the control pressure, output from the PCV and controlled by the N-D control valve;
  a third port connected to an oil passage connected to both the front clutch and servo release part of the quick-down brake; and
  a fourth port adapted for draining pressurized oil from said valve means; and the valve spool being movably received in said valve body and being normally biased by a spring and being selectively biased by the drive pressure or the control pressure, said valve spool including:
  a first land selectively actuated by the drive pressure received through said first port; and
  a second land normally biased by said spring and selectively actuated by the control pressure received through said second port, thus selectively opening said fourth port.

* * * * *